Feb. 20, 1945. L. WEISS Re. 22,607

CONSTRUCTION OF COOLING UNITS

Original Filed Nov. 27, 1940

INVENTOR.
LOUIS WEISS

BY

Robert B. Terry
ATTORNEY.

Reissued Feb. 20, 1945

Re. 22,607

UNITED STATES PATENT OFFICE 22,607

CONSTRUCTION OF COOLING UNITS

Louis Weiss, St. Louis, Mo., assignor to Floyd L. Robison, Fort Smith, Ark.

Original No. 2,323,264, dated June 29, 1943, Serial No. 367,318, November 27, 1940. Application for reissue June 26, 1944, Serial No. 542,081

11 Claims. (Cl. 62—89)

This invention relates to construction of cooling units, and more particularly to an improved method of forming, and arrangement of parts of evaporator or cooling units for use in cabinets for bottled beverages and the like, although many features of the present novelty are equally applicable for use in heat exchange and cooling equipment for other purposes.

The product of the present invention has been particularly designed for an improved and more uniform cooling of bottled products such as bottled beer or soft drinks, and also to enhance the accessibility of chilled bottled products, in a cooling and dispensing cabinet such as used by merchants, in soda fountains, taverns and the like. Although the invention is susceptible of embodiment in other forms of cooling cabinet, it will for brevity be described by way of example, in reference to equipment of the class discussed.

A principal object of the invention is attained in an improved arrangement of piping for the circulation of a cooling medium in a beverage dispensing cabinet, whereby the chilled space within the cabinet is or may be substantially uniformly cooled throughout its useful depth, and more uniformly cooled in all zones lengthwise of the refrigerated space.

Another object of the invention consists in an improved structural arrangement of evaporator piping or tubing, such that the evaporator itself, particularly the parts thereof, constitutes one or a series of conduits for the cooling medium, so arranged that the resulting evaporator construction constitutes a plurality of open-top cells or partitioned spaces, each adapted, for example, for the reception of a case of bottles.

Yet another object of the invention is attained in an improved arrangement of tubing for the circulation of a cooling medium in a cabinet, such that the refrigerant traverses, preferably at least twice, the full length of the cabinet or space therein to be chilled, between the high and low pressure ends of the evaporator, in case the improvements are employed with a mechanical refrigeration system.

A still further object of the invention attained is an improved structure of tubing for the circulation of a cooling medium such that the evaporator parts are maintained at substantially a uniform temperature throughout their depth, or otherwise expressed, so that not only the tubing, but the area intervening it, is kept at substantially the same temperature in the different vertical cooling zones thereof.

Ancillary to the foregoing object is that of providing a structurally more rigid evaporator construction of tube and plate type, such that certain plate elements are metallically united to the tubing and serve a novel structural purpose combined with the objective of augmenting the heat transfer area of the unit, and yet such that the plate elements do not add appreciably to the overall space requirements of the tubing elements were the latter to be used alone.

The foregoing and numerous other objects will appear from the following detailed description of a preferred embodiment of the invention, considered in connection with the accompanying drawing, in which.

Figure 1:
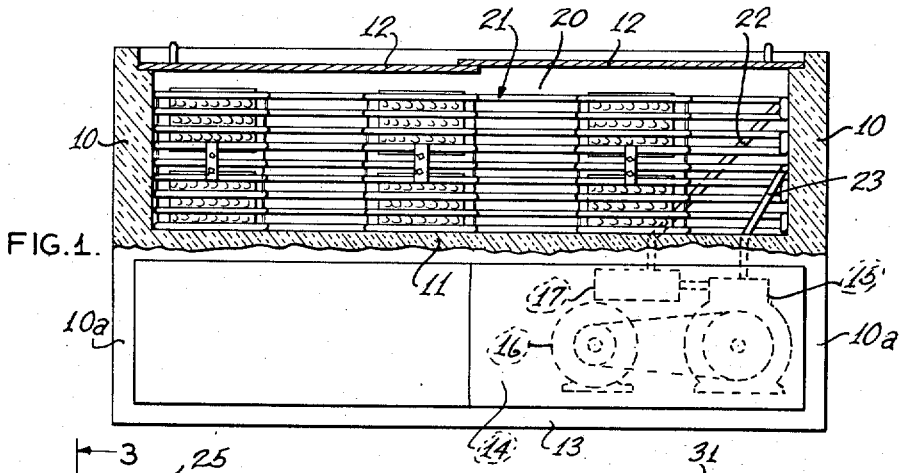
Figure 1 is a vertical longitudinal sectional elevation of a beverage cabinet, equipped in accordance with present improvements.

Referring now by characters of reference to the drawing, although the exact form of the cabinet per se, is not material, it is preferred for the specific purpose of design of the present improvements, that the cabinet consist of an upper housing portion, the end walls of which are indicated at 10, and the deck portion at 11, the space within the walls being cooled by the evaporator unit hereinafter described. The cabinet illustrated is of open top type, access to the cooled space being afforded by slidable or otherwise displaceable top closures or doors 12. In the example shown, the walls 10 are extended downwardly in the portions 10a to form a lower compartment provided with a bottom 13, this compartment, for convenience of reference, being referred to as a mechanical compartment in which there is located a compressor 15, a driving motor 16 and a receiver-condenser unit 17, all shown in dotted lines as being included herein only for completeness, these elements of the assembly forming of themselves, no part of the present invention.

Figure 2:
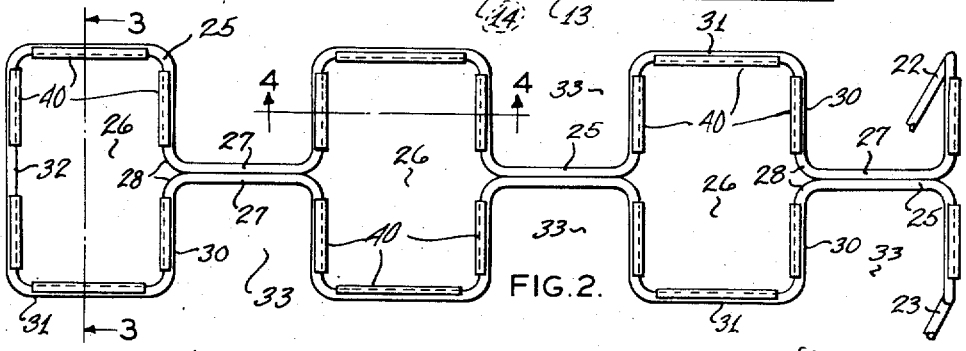
Figure 2 is a top or plan view, somewhat enlarged, of the evaporator unit shown in the cabinet of Figure 1.
Figure 3:
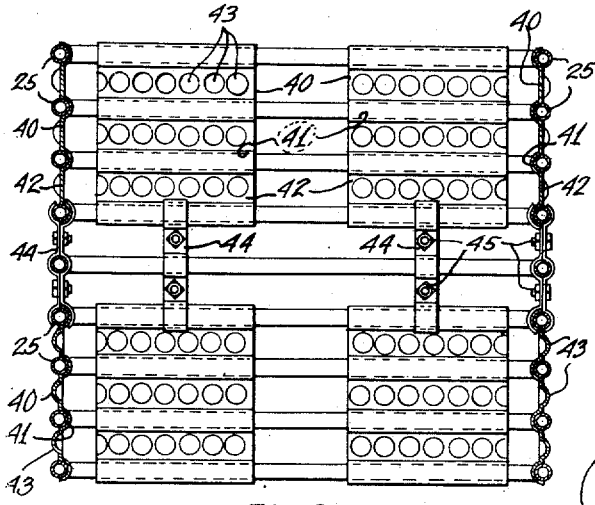
Figure 3 is an enlarged transverse section of the unit of Figure 2, as viewed along line 3—3 thereof.
Figure 4:
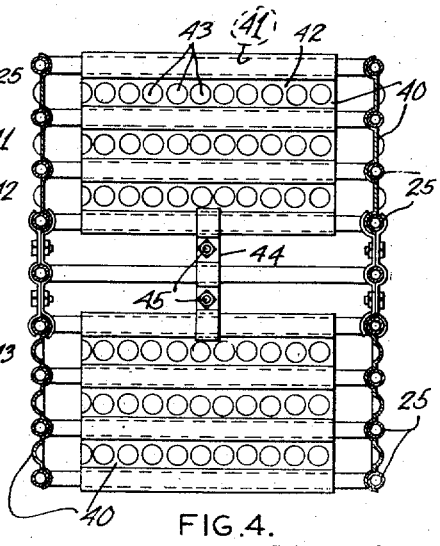
Figure 4 is an enlarged transverse section of a portion of the cooling unit of Figure 2, as viewed along line 4—4 thereof.

There is disposed within the refrigerating compartment 20 of the cabinet an evaporator indicated generally at 21 and the details of construction of which are more fully illustrated in Figs. 2, 3 and 4, as will appear. Suitable connections (not shown in detail) are exemplified by the tube element 22 forming a connection from the receiver-condenser assembly to the input or high pressure end of the evaporator, and a return conduit 23 constituting a connection to the suction side of the refrigerating system, all as well known in the art.

The cooling unit per se is herein, for brevity, referred to as an evaporator, although it will be understood that the principles of construction of the cooling unit are equally adapted to an arrangement for the circulation of externally refrigerated brine, for example, or other refrigerating liquid. In the present example, it is preferred to employ one or a plurality of lengths of reasonably flexible metallic tubing, each length being by further preference continuous, i. e. without joints within the evaporator per se. The lengths of tubing are so formed up, as will later be explained in more detail, that in the finished cooling unit each thereof is for the most part of horizontal trend, and such that the several lengths of tubing generally indicated at 25 are laid up in spaced, parallel, superposed relation, as best appears in Figs. 3 and 4. The number of superposed lengths of tubing, shown as nine in the example selected, will depend obviously upon the desired depth of the open top cells desired for the bottled or other products to be cooled by the cabinet.

Proceeding to a description of the preferred shape of the tubes in horizontal plan, it is preferred, first, that the arrangement of the tubing elements be of a generally sinuous form so that the adjacent companion portions coact, in the manner suggested in Fig. 2, to constitute a plurality of the open top cells or spaces 26, each of these being, by further preference for economy of useful space required by the tubing, of generally rectangular outline as shown. This is accomplished by bending each of the two series of the lengths of tubing to form portions 27 extending longitudinally of the cabinet, then through a relatively wide, right angle bend 28, each portion 27 is connected to an adjacent planar portion 30, the portions 30 extending transversely of or across the cabinet. A similar wide bend 28 serves to connect the portion 30 to an adjacent longitudinal pass 31, which lies alongside and close to the inner side wall of the cabinet. This conformity is continued so as to produce a suitable number of the open top cells 26 the number thereof depending upon the length of cabinet space to be cooled by the evaporator.

At the end of the cabinet opposite the connection end, the zone adjacent the end wall of the cabinet is cooled by an end connecting portion or group thereof, of the tubing elements, indicated at 32.

From the arrangement as seen by Fig. 2, it will be understood as preferable that each of the open-top rectangular cells 26 is of a size sufficient to contain and enclose a case, prevalently 24 bottles, of bottled beverages such as beer, soft drinks or the like. These cells or compartments 26 may be referred to as full-case compartments, and due to the adjacent parallel passes 27 separating the neighboring cells 26 from each other, there are formed two intervening half-case cells, the space within each of which is enclosed on three sides by the tubing, and on the fourth side by the side wall of the cabinet, several of such half-case cells being indicated at 33 (Fig. 2).

The connection end of the evaporator is preferably so constructed that the several lengths of tubing at this end are interconnected by U-shaped bends, and through the terminal bends the single high pressure and suction connections 22 and 23 serve the whole evaporator.

As thus far described, any suitable means for assembling and maintaining the spaced relation of the lengths of tubing of the evaporator may be employed. It is, however, a preference to utilize for the purpose of bridgingly connecting and maintaining in spaced relation the several horizontal lengths of tubing, a plurality of sheet metal bridge or plate elements indicated at 40. The plate elements are each characterized by a plurality of spaced parallel channeled seats 41, which are arcuate in transverse section, and preferably of a depth to engage snugly the tubing elements which seat or nest therein. The conformity of the seats is further such that their arcs are formed on radii substantially equal to the external curvature of the tubing. It is still a further preference that the tube seats or channels be presented all from the same face of the plate or bridge element, so that such element engages corresponding sides of the several superposed tubing elements of any given pass of the evaporator.

The length of the plate or bridge pieces 40 is such that, when formed, they do not extend appreciably above or below the series of tubes transversely bridged thereby. The width of the plate elements is also such that the plate seats 41 engage each of the passes of tubing contiguous thereto, substantially over its planar portion, and traverse the space between the widely bent portions 28 above referred to. As thus formed up, it will appear that with the plate or bridge elements closely in contact with the lengths of tubing as later more fully described, the intervening areas of the plate, being those parts indicated generally at 42, will serve materially to augment the useful area of the structure devoted to heat exchange, it being understood that the arrangement described is fully adapted either for a so-called wet cooler or dry cooler, or, by the addition of suitable partition means (not shown) may be utilized for the refrigeration of one or more wet compartments and concurrently one or more dry compartments.

The aforesaid function of the plate elements in augmenting radiation area is still further enhanced, according to preference, by a plurality of concavo-convex deformed areas 43 lying in and constituting the greater part of the area 42 intervening the superposed lengths of tubing. It is a preference that these be so formed in the bridge plates that their convex side is presented from the same side of the sheet metal element, as the concave or channel seats 41. Obviously, however, other forms and arrangements of the areas 43 may be utilized.

Although the present disclosure is not to be understood as restrictive of the length of the plates 40 or their height in assembly, it has been found to constitute a production economy, to utilize each such plate element in bridging engagement with say four of the superposed passes of tubing, and to complete the structural bridge between such groups of four as by paired spaced holding or clamping elements 44, utilizing bolts or the like 45 in connection with the plates.

There will now be described a preferred method of forming up the tube and plate assembly in such manner that there results, substantially as shown, an arrangement in which the bridge plates are generally parallel to each pass of the tubing elements, it appearing from Figs. 3 and 4 that in spite of the outstruck or instruck portions 41 and 43 each plate lies substantially within the spaced parallel planes tangent to the opposite sides of the several corresponding lateral walls of the tubing, being the spaced planes tangent to such walls.

The bridging plates or fins such as 40 are preferably of a metal of high thermal conductivity such as copper and are initially available in the form of sheet metal plates of suitable gauge. The plates are first cut to the desired areas, following which they are press-formed to provide therein the channel seats 41 of approximately half circular section, and if desired, also the concavo-convex deformed portions 43 for still further augmenting the radiating surface. The metal tubing is arranged in parallel lengths, if necessary having previously been straightened, following which strip solder with a suitable flux is disposed in the channel seat portions of the plate. The several plates are arranged in a series lengthwise of and in engagement with the tubing elements, but spaced from each other so as to allow for the bare areas of the tubing later resulting in the wide bends 28, hereinabove described. The plates and tubing are placed together and held in assembled relation in a press (not shown) of mechanical or hydraulic type, the platens of which are provided with suitable heating apparatus. While heat and pressure are concurrently applied to the seating areas of the bridge and tubing elements, the solder is thoroughly melted and squeezed over the area of each of the seats so as substantially uniformly to bond the metal of the bridge plate to the wall portions of the adjacent tubing, the effect of the pressure and heating step being such that no appreciable unsoldered areas remain in these zones. After a short time under heat sufficient for the solder to attain the liquid state, the coil and plate are sprayed or submerged in water, with the effect of suddenly freezing the solder and attaining a uniform and permanent connection between each of the plates and the several tubes engaged thereby. After all of the plates are thus permanently secured to the tubing elements, the lengths of tubing are applied to a suitable bending jig or the like of such form that the several superposed lengths of tubing are simultaneously bent on the same radius and in a manner to produce the sinuous arrangement preferred, preferably the series of right angularly related passes of tubing, as illustrated.

As will have appeared from the drawing and foregoing description, it is seen that the bridge plates consume no otherwise useful space which, but for their presence, might be utilized for cooling and storage purposes. The spacing of adjacent tubing elements is substantially about as illustrated, from which it results that no portion of the fin or bridge plate is at too great a distance from the refrigerant tubing to exhibit any discernible temperature difference between the plate and the coil proper. Thus even though a material portion of the entire coil is seated in the channel seats 41 of the bridge plates, the high thermal conductivity of the plates maintains substantially the same efficiency for the coil as a cooling unit as if the coil was entirely exposed.

The arrangement for augmenting effective radiation is adaptable to many types of heat exchange apparatus, generally, although for convenience it is described presently in connection with a refrigerant-circulating unit, such as an evaporator. The sinuous arrangement of the lengths of tubing and formation thereof whereby the tubing traverses at least twice the full length of an elongate cabinet space to be cooled, has been found conducive to substantial uniformity of refrigeration at different zones of the chilled space, from end to end thereof, and thus definitely to cooperate with the novel fin or plate arrangement and attachment which, by equalizing temperature between the lower and upper lengths of tubing, serves equally to chill, for example, a lower layer of bottles and an upper layer disposed thereon, with substantially equal cooling effect throughout the depth of the compartments defined by the tubing.

Although the invention has been described by making reference to a selected exemplary embodiment of the invention, the present detail of description is to be understood as illustrative and not in a limiting sense, since many changes may be made in the steps of the method described and in the arrangement of parts and combinations of the article, all without departing from the spirit and full intended scope of the invention as defined by the claims hereunto appended.

I claim:

1. In combination with an elongate open top beverage cooling cabinet, a cooling unit within the cabinet, means for circulating a cooling medium through the unit, the unit consisting of a plurality of lengths of tubing, and bridge elements maintaining said lengths of tubing in spaced parallel relation, the lengths of tubing being formed to present top-open cells of substantially rectangular form, the length of each cell being substantially the width of the cooling chamber of the cabinet, said cells being spaced from each other a distance substantially equal to the width of the cells, the lengths of tubing between the cells constituting partitions arranged one between other adjacent cells, and forming with the walls of the cabinet, two separate half-size cells intervening between alternating top-open cells.

2. A combined cooler and compartmented bottle container unit in combination with a rectangular open-top beverage cooling cabinet and a source of cooling fluid, the unit including a plurality of lengths of tubing for the cooling fluid, bridge plates secured to and serving to maintain the lengths of tubing spaced in parallel relation, the lengths of tubing of the evaporator being formed to provide a plurality of open-top compartments of a generally rectangular form in plan, the length of each compartment being substantially that of the inside width of the cooling cabinet, said compartments being spaced apart a distance substantially equal to the width of the compartments, and the lengths of tubing between the compartments constituting partitions between separate smaller compartments, said smaller compartments intervening between the first mentioned compartments and formed in part by the walls of said cabinet.

3. A cooling and partitioning unit in combination with a rectangular, open-top beverage cooling cabinet and a source of cooling fluid, said unit including a plurality of substantially parallel horizontal lengths of tubing, bridge plates secured to superposed portions of the several lengths of tubing and serving to maintain them in spaced parallel relation and preformed shaping, the lengths of tubing being bent to constitute a bottle-enclosing structure presenting a plurality of top-open bottle compartments of substantially rectangular form, each compartment being of a length substantially the width of the cooling chamber of the cabinet with the compartments spaced apart a distance substantially that of the uniform width of the several compartments, the tubing forming the several said compartments being interconnected by lengths of tubing constituting partitions arranged one between adjacent compartments and forming with the walls of the cabinet, two separate half-size compartments intervening between the adjacent alternating top-open compartments aforesaid, the several lengths of tubing of the unit each having an inlet and outlet connection at the same end of the unit, whereby each of said lengths of tubing traverses at least twice the full length of the cabinet.

4. In combination with an open-top beverage cooling cabinet, a combined cooling unit and cabinet partitioning structure within the cabinet, and means for circulating a refrigerant through the unit, the unit including a plurality of spaced, superposed, substantially parallel lengths of tubing, combined tubing supports and heat absorption plates bridging the corresponding portions of the lengths of tubing, and serving to maintain the shaping of and support the cooling unit independently of the side walls of the cabinet, the lengths of tubing being formed with a series of substantially equally spaced, approximately right angular bends, whereby to result in a plurality of open-top compartments of substantially rectangular form, the length of each compartment being substantially equal to the width of the cooling chamber of the cabinet, with the compartments spaced apart a distance substantially equal to their width, the tubing of each of said compartments being connected to that of other compartments, by portions extended along a longitudinal median plane of the cooling cabinet, the last said portions constituting partitions between adjacent compartments, serving to form with the walls of the cabinet, pairs of half-size compartments intervening those first aforesaid.

5. In an open-top beverage cooling cabinet, a cooling unit within the cabinet, means for circulating a refrigerant through the unit, the unit being constituted of a plurality of lengths of metal tubing formed to present a plurality of top-open cells of substantially rectangular form and substantially the width of the cooling chamber of the cabinet, with adjacent cells spaced from each other a distance approximating the cell width, the tubing of the cells being continued therebetween to form a partition serving with the cabinet walls to constitute fragmentary cells intervening those aforesaid, a plurality of metal plates, metallically united to the lengths of tubing, serving to maintain them in predetermined vertically spaced relation and arranged for support of the tubing and cooling unit from the floor portion of the cooling cabinet independently of support by the walls thereof, a plurality of said plates being characterized by outstruck portions formed between the tubing elements, said outstruck portions serving to augment the rigidity of the plates in supporting the tubing and serving to augment the heat exchange area of the plates.

6. In combination with an open-top beverage cooling cabinet, a cooling unit in the cabinet, means for circulating a refrigerant through the unit, the unit consisting of a plurality of lengths of tubing characterized by a series of spaced, substantially right angular bends so spaced along the tubing that, in assembly in the cabinet, the lengths of tubing constitute an enclosure presenting a plurality of spaced, open-top, rectangular compartments, each substantially the width of the cabinet interior, the tubing elements being further so formed that said compartments are spaced apart a distance approximating the width of the several compartments, and the tubing being extended between and connecting with the tubing of the adjacent compartments and provide partitions arranged one intermediate the cabinet walls, and forming therewith two half-size compartments intervening between the alternating top-open compartments, plate elements serving to maintain the lengths of tubing in spaced relation, each of said plate elements being formed to provide a plurality of parallel, part cylindrical recesses therein, adapted to receive and partly embrace the several lengths of tubing, and a metallic uniting material in and substantially coextensive in area with each of said recesses, whereby structurally to unite the lengths of tubing and the plate elements to maintain their assembled relation and to assure an intimate thermal exchange relation between the lengths of tubing and the plate elements.

7. In combination with an elongate open-top beverage cooling cabinet, a cooling unit within the cabinet, means for circulating a cooling medium through the unit, the unit consisting of a plurality of lengths of tubing maintained in spaced parallel relation, the length of tubing being formed to present spaced top-open cells of substantially rectangular form, and the lengths of tubing between the cells constituting partitions arranged one between other adjacent cells and forming with the walls of the cabinet two separate half-sized cells intervening between alternating top-open cells.

8. A combined cooler and compartmented bottle container unit in combination with a rectangular open-top beverage cooling cabinet and source of cooling fluid, the unit including a plurality of lengths of tubing for the cooling fluid maintained in parallel relation, the lengths of tubing being formed to provide a plurality of open-top compartments of a generally rectangular form in plan, and the lengths of tubing between the compartments constituting partitions between separate smaller compartments intervening between the first mentioned compartments and formed in part by the walls of said cabinet.

9. In combination with an open-top beverage cooling cabinet, a combined cooling unit and cabinet partitioning structure within the cabinet, and means for circulating a refrigerant through the unit, the unit including a plurality of spaced, superposed, substantially parallel lengths of tubing, the lengths of tubing being formed with a series of substantially equally spaced, approximately right angular bends, whereby to result in a plurality of open-top compartments of substantially rectangular form, the tubing of each of said compartments being connected to that of other compartments by portions extended along a longitudinal median plane of the cooling cabinet, the last said portions constituting partitions between adjacent compartments and serving to form with the walls of the cabinet, pairs of half-size compartments intervening those first aforesaid.

10. The combination with an open-top beverage cooling cabinet, of vertically spaced continuous tubing bent to form refrigerating coils for the cabinet and said coils arranged to provide a plurality of open top compartments, certain compartments being entirely enclosed by the coils and others utilizing a wall of the cabinet as an outside closure, and the partially enclosed compartments being half the size of the entirely enclosed compartments and arranged in pairs between the same lengthwise of the cabinet.

11. The combination with an open top beverage cooling cabinet, of vertically spaced continuous tubing bent to form refrigerating coils for the cabinet and said coils arranged to provide a plurality of open top compartments, certain compartments being entirely enclosed by the coils and others utilizing a wall of the cabinet as an outside closure, and the tubing of said entirely enclosed compartments being connected by portions extending along a longitudinal medial plane of the cooling cabinet which portions together with the spaced coils of the adjacent entirely enclosed compartments form the partially enclosed compartments of the cabinet.

LOUIS WEISS.